Patented Jan. 31, 1950

2,495,904

UNITED STATES PATENT OFFICE 2,495,904

PRODUCTION OF AROMATIC KETO ALCOHOLS

Herman Pines and Bruno Kvetinskas, Chicago, Ill., assignors to Universal Oil Products Company, Chicago, Ill., a corporation of Delaware No Drawing. Application March 29, 1946, Serial No. 658,206

11 Claims. (Cl. 260—592)

This invention relates to a process for producing aromatic keto alcohols and particularly for producing acylphenyl carbinols.

An object of this invention is to produce an aromatic keto alcohol by oxidizing an alkyl aromatic ketone.

Another object of this invention is to oxidize an alkyl aromatic ketone containing a secondary alkyl group to produce therefrom an aromatic keto alcohol.

A further object of this invention is the production of dimethylacetophenyl carbinol by the oxidation of isopropylacetophenone.

One specific embodiment of the present invention relates to a process for producing an aromatic keto alcohol which comprises reacting oxygen and an alkyl aromatic ketone containing a secondary alkyl group in the presence of an oxidation catalyst.

Another embodiment of this invention relates to a process for producing an aromatic keto alcohol which comprises reacting oxygen and an alkyl aromatic ketone containing a secondary alkyl group in the presence of an oxidation catalyst comprising a metal having an atomic number of from 23 to 30, inclusive.

Still another embodiment of this invention relates to a process for preparing a dialkylacylphenyl carbinol which comprises reacting an alkylated phenyl ketone containing a secondary alkyl group in the presence of an oxidation catalyst comprising a metal having an atomic number of from 23 to 30, inclusive.

We have found that the oxidation of an alkyl aromatic ketone containing a secondary alkyl group is a means of producing an aromatic keto alcohol that is difficult to prepare by other means. Thus the action of oxygen upon isopropylacetophenone at a temperature of 100° C. yields a minor proportion of diacetylbenzene and a major proportion of an alcohol, namely dimethylacetophenyl carbinol, the latter compound being difficult to prepare by other means.

Aromatic ketones which are oxidized by our process to give aromatic keto alcohols have the general formula:

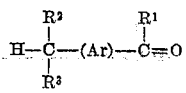

wherein (Ar) represents an aromatic ring including phenyl, naphthyl, or other polycyclic aromatic ring and $R^1$ represents an alkyl, cyclo-alkyl, an aryl, substituted alkyl, or substituted cyclo-alkyl group in which the substituent is chlorine, bromine, acyl, hydroxyl, etc. Also, $R^2$ and $R^3$ represent alkyl groups which may be the same or different. In each of these alkyl aromatic ketones, the carbon atom which is combined with groups $R^2$ and $R^3$ is also combined with a hydrogen atom. During the oxidation, this hydrogen atom is replaced by a hydroxyl group forming an alcohol, although at more severe conditions of oxidation the carbinol group is sometimes oxidized to a keto group.

Phenyl ketones to which our process is particularly applicable are oxidized to keto phenyl carbinols according to the equation:

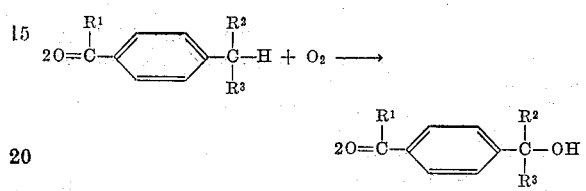

wherein $R^1$ represents an alkyl, cyclo-alkyl, an aryl, substituted alkyl, or substituted cyclo-alkyl group in which the substituent is chlorine, bromine, acyl, hydroxyl, etc. Also, $R^2$ and $R^3$ represent alkyl groups which may be the same or different.

In order to obtain a high yield of the desired alcohol, it is necessary to carry out the oxidation process at relatively mild conditions in the presence of a catalyst. The catalyst used in our process contains at least one element with an atomic number of from 23 to 30, inclusive, these including vanadium, chromium, manganese, iron, cobalt, nickel, copper and zinc. These metals may be used as catalyst in the form of the metal itself, as an oxide thereof, or preferably as a salt of an organic acid, for example, a fatty acid such as stearic acid. Catalytic metals or their oxides may also be deposited on carriers such as granular or crushed pumice, porcelain, clay, firebrick, quartz, alumina, silica, etc., or used in conjunction with other metal oxides which by themselves do not have appreciable catalytic activity as barium oxide, lead oxide, etc. or used in conjunction with salts which by themselves are not oxidizing catalysts.

The oxidation process is carried out at a temperature of from about 50° to about 250° C., depending upon the nature of the alkyl aromatic ketone charged to the process which is effected at a pressure of from substantially atmospheric to about 100 atmospheres. For convenience in operation, the process is frequently carried out at pressures of from about 5 to about 15 atmospheres. Oxygen is used as such or the oxidation is effected by means of air or a mixture of oxygen and an inert gas.

Our process may be carried out in either batch or continuous types of operation although the latter is generally preferred. In continuous operation an alkyl aromatic ketone containing a secondary alkyl group and air or oxygen or some other oxygen-containing gas are passed through a heated reactor containing at least one metal having an atomic number of from 23 to 30 used as such or as the oxide and preferably supported by a carrier such as silica, crushed porcelain, firebrick, quartz, or other material which does not exercise a decomposing action on the aromatic keto alcohol formed in the process or on the alkyl aromatic ketone charged thereto.

The following data are given to illustrate the type of results obtained in this process, although the results presented are not introduced with the intention of restricting unduly the broad scope of the invention.

To 31 grams of isopropylacetophenone, with a boiling point of 118° C. at 13 mm. pressure and a refractive index, $n_D^{20}$, of 1.5235, was added 0.06 gram of manganese stearate and the resultant mixture was heated at 100° C. for 19 hours while oxygen was passed thereto at a rate of 2.5 liters per hour. The resultant reaction product which had a peroxide number of 2574 was first treated to remove the peroxides by shaking with a slightly acidic solution containing 25% by weight of ferrous sulfate in water and the product was then distilled. It was found that 40% of the isopropylacetophenone reacting yielded 20% of diacetylbenzene and 80% of dimethylacetophenyl carbinol.

The nature of the present invention and its utility are evident from the specification and example although neither section is intended to limit unduly the generally broad scope of the invention.

We claim as our invention:

1. A process for producing an aromatic keto alcohol which comprises reacting oxygen and an alkyl aromatic ketone containing a secondary alkyl group at a temperature of from about 50° to about 250° C. in the presence of an oxidation catalyst comprising as its essential active ingredient a metal having an atomic number of from 23 to 30, inclusive.

2. A process for producing an aromatic keto alcohol which comprises reacting oxygen and an alkyl aromatic ketone containing a secondary alkyl group at a temperature of from about 50° to about 250° C. and at a pressure of from about 1 to about 100 atmospheres in the presence of an oxidation catalyst comprising as its essential active ingredient a metal having an atomic number of from 23 to 30, inclusive.

3. A process for preparing a dialkylacylphenyl carbinol which comprises reacting oxygen and an alkylated phenyl ketone containing a secondary alkyl group at a temperature of from about 50° to about 250° C. in the presence of an oxidation catalyst comprising as its essential active ingredient a metal having an atomic number of from 23 to 30, inclusive.

4. A process for preparing a dialkylacylphenyl carbinol which comprises reacting oxygen and an alkylated phenyl ketone containing a secondary alkyl group at a temperature of from about 50° to about 250° C. and at a pressure of from about 1 to about 100 atmospheres in the presence of an oxidation catalyst comprising as its essential active ingredient a metal having an atomic number of from 23 to 30, inclusive.

5. A process for preparing a dialkylacetophenyl carbinol which comprises reacting oxygen and an alkyl acetophenone containing a secondary alkyl group at a temperature of from about 50° to about 250° C. in the presence of an oxidation catalyst comprising as its essential active ingredient a metal having an atomic number of from 23 to 30, inclusive.

6. A process for preparing a dialkylacetophenyl carbinol which comprises reacting oxygen and an alkyl acetophenone containing a secondary alkyl group at a temperature of from about 50° to about 250° C. and at a pressure of from about 1 to about 100 atmospheres in the presence of an oxidation catalyst comprising as its essential active ingredient a metal having an atomic number of from 23 to 30, inclusive.

7. A process for preparing a dialkylacetophenyl carbinol which comprises reacting oxygen and an alkyl acetophenone containing a secondary alkyl group at a temperature of from about 50° to about 250° C. and at a pressure of from about 1 to about 100 atmospheres in the presence of an oxidation catalyst comprising manganese as its essential active ingredient.

8. A process for preparing dimethylacetophenyl carbinol which comprises reacting oxygen and isopropylacetophenone at a temperature of from about 50° to about 250° C. in the presence of an oxidation catalyst comprising as its essential active ingredient a metal having an atomic number of from 23 to 30, inclusive.

9. A process for preparing dimethylacetophenyl carbinol which comprises reacting oxygen and isopropylacetophenone at a temperature of from about 50° to about 250° C. and at a pressure of from about 1 to about 100 atmospheres in the presence of an oxidation catalyst comprising as its essential active ingredient a metal having an atomic number of from 23 to 30, inclusive.

10. A process for preparing dimethylacetophenyl carbinol which comprises reacting oxygen and isopropylacetophenone at a temperature of from about 50° to about 250° C. and at a pressure of from about 1 to about 100 atmospheres in the presence of an oxidation catalyst comprising manganese as its essential active ingredient.

11. A process for preparing dimethylacetophenyl carbinol which comprises reacting oxygen and isopropylacetophenone at a temperature of from about 50° to about 250° C. and at a pressure of from about 1 to about 100 atmospheres in the presence of an oxidation catalyst comprising manganese stearate as its essential active ingredient.

HERMAN PINES.
BRUNO KVETINSKAS.

REFERENCES CITED

The following references are of record in the file of this patent:

UNITED STATES PATENTS

| Number | Name | Date |
| --- | --- | --- |
| 2,004,069 | Bruson et al. | June 4, 1935 |
| 2,302,466 | Palmer | Nov. 17, 1942 |
| 2,376,674 | Emerson et al. | May 22, 1945 |
| 2,390,368 | Hochwalt | Dec. 4, 1945 |